(No Model.)

H. L. JUDD.
CURTAIN HOOK PIN.

No. 254,983. Patented Mar. 14, 1882.

Witnesses
Harold Serrell
J. Gail

Inventor
per Hubert L. Judd
Lemuel W. Serrell
atty

UNITED STATES PATENT OFFICE.

HUBERT L. JUDD, OF BROOKLYN, NEW YORK.

CURTAIN-HOOK PIN.

SPECIFICATION forming part of Letters Patent No. 254,983, dated March 14, 1882.

Application filed January 16, 1882. (No model.)

*To all whom it may concern:*

Be it known that I, HUBERT L. JUDD, of Brooklyn, in the county of Kings and State of New York, have invented an Improvement in Curtain-Hook Pins, of which the following is a specification.

Shield-pins have been made of a single piece of wire pointed at one end and bent with a spring-coil, and having at the other end a shield receiving the point. With pins of this general character a hook has been employed, so that the pin may be run into the folds of the curtain and the hook used to connect the curtain to the suspending ring or hook of the cornice. In some instances the hook has been made of the same wire as the rest of the pin. In other cases the hook has been a separate piece of metal.

My invention relates to a shield pin and hook combined, in which the hook is made of the same wire as the pin, and there is a metal clamp that connects the wires at their bends where the hook branches out from the body of the pin, thereby preventing the metal in the body becoming bent at the junction of the same with the hook.

This improvement facilitates the construction of the combined hook and pin, because the wires are simply bent to shape, and none of the parts are twisted together, and the metal is stiffened and the wires kept in line at the body of the pin.

Figure 1:
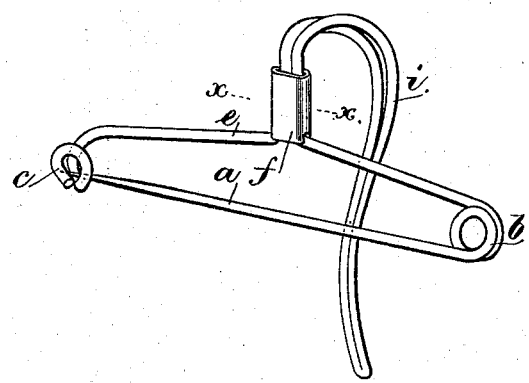
Figure 2:
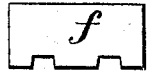
Figure 3:

In the drawings, Figure 1 is a perspective view of the pin and hook complete. Fig. 2 represents the piece of sheet metal that forms the clamp, and Fig. 3 is a section of the parts at the line $x\ x$.

The pin portion $a$, coil $b$, and shield $c$ are of any of the well-known forms in shield-pins. The body $e$ is not continuous, as in shield-pins, but the wire is bent off double at right angles, or nearly so, and formed into a hook, $i$, that is adapted to engage with a cornice-ring, or with a tenter-hook or other support for the curtain. If these parts only were used, the body $e$ would not be sufficiently rigid, as the wire would be liable to spring and bend at the junction of the hook and body. To prevent this I combine with the pin and hook a sheet-metal clamp, $f$, that is wrapped around the wires at the junction of the hook and body, so as to stiffen the parts and make the pin and hook firm and strong.

The edge of the strip may be notched, as shown, for the wire of the body, and the metal of the strip is compressed at this edge so as to grasp the said wire.

It will be evident that the shield-pin and hook, although formed of one piece of wire, are subject to considerable strain, both in the act of pushing the pin into the curtain and in suspending that curtain by the hook, and that the two portions of the body are kept in line with each other by the sheet-metal clamp $f$, so as to be rigid and not liable to be displaced by the strain to which they are subjected.

I claim as my invention—

In a curtain hook and pin made of one piece of wire, the combination, with the shield-pin and curtain-hook, of a metal clamp surrounding the wire at the junction of the hook and body of the shield-pin, substantially as specified.

Signed by me this 7th day of January, A. D. 1882.

H. L. JUDD.

Witnesses:
GEO. T. PINCKNEY,
WILLIAM G. MOTT.